Patented Mar. 12, 1946

2,396,561

UNITED STATES PATENT OFFICE 2,396,561

PROCESS

Earl W. Flosdorf, Upper Darby, Pa., assignor to Lyophile-Cryochem Company, Philadelphia, Pa., a corporation of Pennsylvania No Drawing. Application June 10, 1943, Serial No. 490,329

11 Claims. (Cl. 99—206)

This invention relates to improvements in the preservation of labile materials by the removal of water therefrom by evaporation from the frozen state.

The preservation of biologicals, such as sera, plasma, antitoxins, viruses, etc., by freezing followed by removal of water therefrom with the aid of a high vacuum while keeping the material frozen until most of the water is removed, and then permitting the temperature of the mass to rise to around room temperature to facilitate the removal of the last traces of water, is now well known and used quite widely. Experience has shown that these desiccated substances are hygroscopic. If exposed to the atmosphere, they rapidly absorb sufficient water to spoil their keeping qualities, and even when stored in a rubber stoppered bottle, sufficient water vapor will pass through the stopper and be absorbed by the material to radically reduce its keeping qualities. The common practice has been to desiccate the material in the final container and seal it therein under vacuum. Where a rubber stoppered container is used, the entire container is sealed in a tin can or the like, or else the stopper is seated in the neck of the container which is then flame-sealed above it, giving an all-glass seal. Such protection is required to protect the dry material from water vapor which would otherwise penetrate the stopper and be absorbed.

So far as I am aware, all prior efforts to desiccate such materials in trays or open containers, and then transfer the desiccated material to storage or shipping containers, have proven unsuccessful. Disregarding considerations of possible contamination, one of the major difficulties has been that transferring the material from a tray or the like to a container involves exposure to the atmosphere, and the materials absorb sufficient water during exposure to reduce their keeping qualities. Thus with biologicals, it has been found that excellent keeping properties can be obtained if the water content is reduced to about .5%, but if the water content rises to 2.0% or thereabouts, the keeping properties are substantially lessened. The nature of the materials is such that this small amount of water is rapidly absorbed upon exposure to the air, and even the short exposure involved in any transfer of material from one container to another may be sufficient for the absorption of this amount of water.

With such materials as fruit juices, especially orange juice, the problem is even more aggravated. Such juices contain small amounts of oils and fats of quite low melting point. Unless the water content of orange juice, for example, is reduced well below .5%, the desiccated product, on standing, will turn within a relatively short time to a gummy mass, very difficult to dissolve or disperse in water. If the water content is kept well below .5%, for example, below .15%, the desiccated orange juice will maintain a solid form at ordinary temperatures, although if warmed to 100 to 110° F., it has a marked tendency to become gummy and difficult to dissolve or disperse in water. Other substances, for example, soups, other fruit juices, coffee, meat juices, etc., exhibit this same property in varying degress, largely depending, I believe, upon their content of oil or fat, i. e., materials of an oleaginous nature. As produced, such desiccated products have the oleaginous material dispersed throughout the solid mass in finely divided form, and apparently if the oleaginous material remains dispersed, the product maintains its porous, readily soluble form. If the product is not dry enough, even though it appears to be dry, the oils or fats apparently congeal or lose their dispersion and the droplets coalesce, causing the mass to become more or less gummy and with a slow rate of solubility.

Thus while it is possible to process such materials as orange juice and obtain a product with reasonably good keeping qualities by keeping its water content very low and keeping its temperature well below 100° F., such processing has been impractical, partly because of the requirements as to water content at the end of the desiccation, it being relatively difficult to reduce the water content to .15% or less, and partly because of the difficulties encountered in attempting to package the material while maintaining its low water content because of its hygroscopic nature. With such products as orange juice, soups, and the like the processing of the material in the final containers, commonly used for biologicals, has not yet been economically feasible.

The present invention provides improvements in the processing of labile aqueous materials, and more particularly in the step of transferring the materials from the container in which they are processed to the container in which they are stored or distributed, which permit their being sealed within the final container with a moisture content little, if any, greater than that obtained at the end of the desiccation, in other words, without substantial absorption of water during the period of exposure involved in the transfer from the processing chamber to the final container.

In accordance with the present invention, the temperature of the desiccated material at the end of the desiccation operation is raised above room temperature, and to a temperature at which its vapor pressure is such that its tendency to absorb water vapor from the air is greatly reduced, if not eliminated, and while at that elevated temperature, the desiccated material is transferred to the final containers and sealed therein. With such products as orange juice, which contains quite a bit of oily material, it is advantageous to incorporate in the product, before it is frozen for desiccation, a small amount of a material which inhibits or prevents the agglomeration of the dispersed oleaginous material, such as a protective colloid, including gelatin, gum tragacanth, pectin, gum acacia, agar, gum karaya, casein, albumen or the like; such crystalloids as dextrose and similar sugars, etc. Such products inhibit the coalescence or loss of dispersion of the oily and fatty materials.

The temperature of the material, at the time of its transfer and exposure to the atmosphere may vary. The considerations which bear upon the selection of an appropriate temperature are the following:

(1) The vapor pressure of the water in the desiccated material. This will vary with the nature of the particular material, and with the extent of its desiccation, decreasing with increased degrees of desiccation.

(2) The partial pressure of the water vapor in the air. To completely prevent absorption of water, the vapor pressure of the desiccated material must be at least as great as, and should be greater than, the partial pressure of the water vapor in the air.

(3) The maximum permissible water content of the final product. Thus if it is not feasible to prevent completely absorption of water by keeping the temperature of the desiccated material such that its water vapor pressure exceeds the partial pressure of the water vapor in the air, some absorption of water vapor is permissible if the amount absorbed does not raise the water content of the product above that which will give satisfactory keeping properties. At the elevated temperatures at which the material is transferred in accordance with this invention, the absorption of water, if not completely prevented, is radically retarded.

It has been found, for example, that with orange juice to which has been added ½ of 1% of gelatin and which has been desiccated to a water content of 1%, a temperature of from 35 to 65° C., with an atmospheric temperature of 30° C. or lower gives satisfactory results. The portion of the range 35 to 65° C. used may depend upon the relative humidity, the higher temperatures being used on relatively humid days and the lower temperatures on days when the air is relatively dry.

It should be noted that unless a protective colloid such as gelatin is used with the orange juice, the desiccated product cannot be heated to the range 35 to 65° C. without becoming gummy, even if its water content is as low as 0.15% or lower.

The desiccation, after the small amount of gelatin is dissolved in the orange juice, is carried out in the usual way, by freezing the juice and then subjecting it to the action of a vacuum. As the material, after desiccation, is to be transferred to final containers, it is convenient to process it in trays, each to contain the amount, or a multiple of the amount, to be put in one container, or to process it in continuous apparatus, such as a belt fed dryer, as by depositing liquid or frozen material on a moving belt within a vacuum chamber, or introducing it into a revolving drum operating on a continuous feed basis, or the like. Any of the known procedures, such as those in which the material, in the receptacle selected, is placed in a chamber which is then evacuated, may be used. A direct pump, or a pump with a cold condenser interposed between it and the vacuum chamber, or a pump with an absorbent or adsorbent of water vapor between it and the vacuum chamber, may be used, these procedures being well known. To speed up the process, it is customary to supply heat to the frozen material during the desiccation, for example, by jacketing the chamber and circulating hot water through it, by having steam pipes run underneath the trays, by infra red or electrical resistance heating, or in other ways, the object being to supply heat to the frozen material at a sufficiently high rate to maintain the sublimation without raising the temperature sufficiently high to cause the material to melt or soften. When the water content is reduced to around 2 to 8%, which corresponds to the removal of perhaps 99% of the water originally present, the product is dry enough so that it does not melt or soften at temperatures a little above the freezing point, and the temperature of the material undergoing desiccation is gradually raised, or is permitted to rise, above the freezing point of water, to whatever the temperature of transfer is. The maintenance of the vacuum is continued during this period so that the last of the water vapor is removed, not from a frozen material, but from a material above the freezing point but containing so little water that it appears to be dry. When the desiccation has proceeded to the desired extent (in the case of orange juice containing about ½% of gelatin, when the water content is about 1%), and the temperature of the material is such that its vapor pressure is relatively high, advantageously greater than the partial pressure of the water vapor in the surrounding air (in the case of such orange juice under ordinary room conditions about 35 to 65° C.), the material is removed from the vacuum chamber, rapidly transferred from the trays in which it is desiccated to the final containers, which may be tin cans, tubes, or other suitable containers which may be hermetically sealed, and sealed therein. With food products, such as orange juice, the highly porous, friable material which is the direct product of the desiccation operation may be compressed to around 5 to 20% of the volume of the original orange juice to save packaging material and shipping space. It may be compressed to a still smaller volume. Usually, with products such as orange juice, the friable, porous masses from the drying operation are pulverized before compression. This operation should be carried out with apparatus which is kept warm or hot, to prevent cooling of the dried material. Similarly, the containers into which the material is introduced should be warm to prevent condensation of water on their inner surfaces and to avoid chilling the dried material until it is sealed within the containers. Of course, some cooling of the material usually takes place during the transfer, and it is well to allow for this in fixing the temperature to which the material is initially heated. Such a desiccated product, when hermetically sealed, has excellent keeping properties and will redissolve or redisperse in water rapidly and completely after long periods of storage. Desiccated orange juice, sealed with a small amount of an added protective colloid, and a water content of 1 to 2% will retain its property of rapidly dissolving in water even after exposure to temperatures in excess of 100° F. for long periods of time.

In the practice of the invention it is not always necessary to keep the dehydrated material from contact with air or other gas while at a temperature such that it will absorb substantial quantities of water, providing the water vapor content of the gas or air is low enough. Thus, in some instances, it is desirable to store the dried product in bulk for substantial periods before packaging it. This may be accomplished by transferring the heated material from the desiccation operation to storage bins, barrels, multiple small bins or the like in which the air or gas is very dry, or the volume thereof is small. A convenient procedure is to store the bulk material in bins or the like which are kept quite full of the dried material and in which circulation of air is minimized or prevented. In this way, even if the air originally in the bin or the like has a fairly high humidity, the humidity is soon reduced by absorpton by the dried material, and the amount of water so absorbed is not great because of the limited volume of air from which it can be absorbed. If the volume of air is small and its circulation is prevented, the amount of water absorbed by the dried material is insufficient to cause deterioration.

Dehumidification of the air does not seem to be a practical equivalent of the technique just outlined. With dried orange juice at 45° C., for example, the relative humidity would have to be around 1% or less to prevent absorption of sufficient water to cause the product to deteriorate.

Even where the dried product is not stored in bins or the like for a period of time between the end of the desiccation operation and the final sealing in cans or the like, it is advantageous to minimize circulation of air in contact with it, and to hold to a minimum the volume of air or other gas to which the dried material is exposed.

I claim:

1. In the preservation of labile products, which in desiccated form are hygroscopic, by vacuum desiccation, the step of heating the desiccated material while under vacuum to a temperature higher than that of the surrounding atmosphere, and transferring it, with exposure to the atmosphere, to a container while at such elevated temperature and sealing it therein.

2. In the preservation of labile products, which in desiccated form are hygroscopic, by vacuum desiccation, the step of transferring the desiccated material from a vacuum space to a container in which it is sealed while at a temperature such that its vapor pressure exceeds the partial pressure of water vapor in the atmosphere to which it is exposed during the transfer.

3. In the preservation of food materials containing oleaginous constituents by vacuum desiccation, the step of heating the desiccated material while under vacuum to a temperature higher than that of the surrounding atmosphere, and transferring it, with exposure to the atmosphere, to a container while at such elevated temperature and sealing it therein.

4. The method of preserving citrus fruit juices which comprises freezing the juice, removing water therefrom by vacuum sublimation, raising the temperature of the dried material to at least the temperature at which its vapor pressure equals the partial pressure of water vapor in the surrounding atmosphere while the material is under a vacuum and then transferring it, with exposure to the atmosphere, to a container and sealing it therein.

5. In the preservation of aqueous alimentary products having oleaginous constituents by vacuum desiccation from the frozen state, the steps of incorporating therein, before freezing, a small amount of an inhibitor of coalescence of the oleaginous material, and, at the end of the desiccation, heating the desiccated product to a temperature higher than that of the surrounding atmosphere, and transferring it, with exposure to the atmosphere, to a container while at such elevated temperature and sealing it therein.

6. In the preservation of citrus fruit juice by vacuum desiccation from the frozen state, the steps of incorporating, in the juice before freezing, a small amount of a protective colloid, and, at the end of the desiccation, heating the desiccated product to a temperature higher than that of the surrounding atmosphere, and transferring it, with exposure to the atmosphere, to a container while at such elevated temperature and sealing it therein.

7. In the preservation of citrus fruit juices by vacuum desiccation from the frozen state, the step of heating the desiccated material while under vacuum to a temperature higher than that of the surrounding atmosphere whereby its tendency to absorb water from the atmosphere is minimized, and transferring it to and sealing it in a container.

8. The process as in the preceding claim in which the dried material is stored in bins or the like after desiccation and before it is placed in the containers, and in which circulation of air in the bins is repressed.

9. In the preservation of aqueous alimentary products having oleaginous constituents by vacuum desiccation from the frozen state, the steps of incorporating therein, before freezing, a small amount of an inhibitor of coalescence of the oleaginous material, and, at the end of the desiccation, heating the desiccated product to a temperature higher than that of the surrounding atmosphere, and transferring it, with exposure to the atmosphere, to a container and sealing it therein.

10. In the preservation of citrus fruit juice by vacuum desiccation from the frozen state, the steps of incorporating, in the juice before freezing, a small amount of a protective colloid, and, at the end of the desiccation, heating the desiccated product to a temperature higher than that of the surrounding atmosphere, and transferring it, with exposure to the atmosphere, to a container and sealing it therein.

11. In the preservation of labile products, which in desiccated form are hygroscopic, by vacuum desiccation, the step of heating the desiccated material while under vacuum to a temperature higher than that of the surrounding atmosphere, and transferring it, with exposure to the atmosphere, to a container while repressing the absorption of moisture by it.

EARL W. FLOSDORF.